United States Patent [19]
Buhrmann, Jr.

[11] 3,935,834
[45] Feb. 3, 1976

[54] FROST LINE INDICATOR
[75] Inventor: Gilbert W. Buhrmann, Jr., Alexandria, Va.
[73] Assignee: The United States of America as represented by the Secretary of the Army, Washington, D.C.
[22] Filed: Feb. 4, 1975
[21] Appl. No.: 546,952

[52] U.S. Cl. .......................... 116/114 V; 73/170 R
[51] Int. Cl.² ........................................... G01D 1/00
[58] Field of Search ....... 116/114 V, 114.5; 33/315; 73/295, 356, 344, 339, 170 R

[56] References Cited
UNITED STATES PATENTS
3,696,675 10/1972 Gilmour............................... 73/295

Primary Examiner—Donald O. Woodiel
Attorney, Agent, or Firm—Nathan Edelberg; Robert P. Gibson; Glenn S. Ovrevik

[57] ABSTRACT

Apparatus for indicating the frost line depth of the ground for example is disclosed. The apparatus includes an outer hollow tube that is buried in the ground; an inner sleeve or tube filled with a mixture of sand and a temperature sensitive dye fits inside the outer tube. The inner tube is attached to an end cap by rope or like and the end cap is threaded to mate with threads provided at the end of the outer tube that protrudes above the ground. After the apparatus has been in place for a length of time sufficiently long to permit the apparatus to attain the same temperature as the surrounding ground, the inner tube is removed to read the depth to which the ground is frozen. The dye in the inner tube changes color to the depth at which the ground is frozen and remains the same color below this depth. The inner tube is provided with gradations so that depth can be read directly from the tube.

14 Claims, 6 Drawing Figures

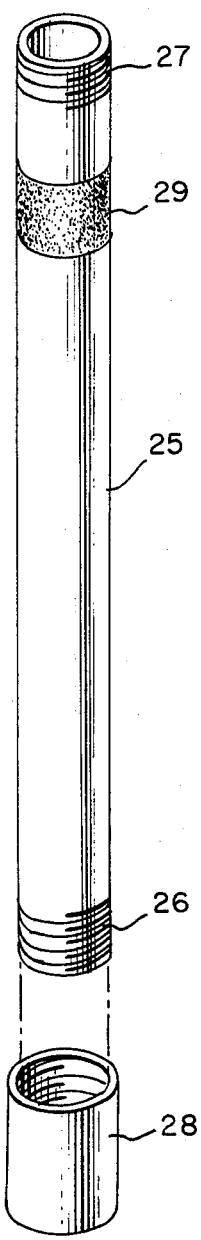
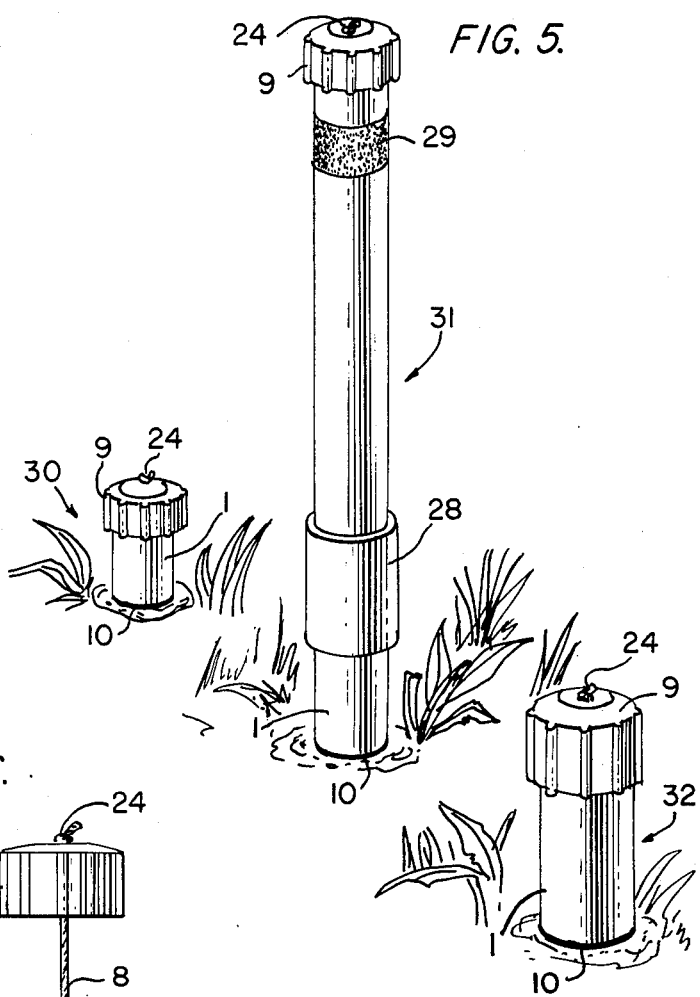
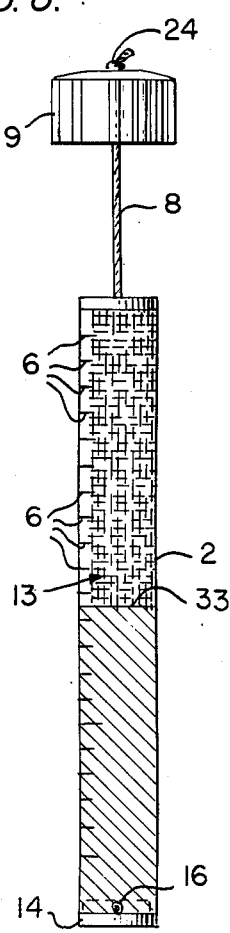

025
FROST LINE INDICATOR

The invention described herein may be manufactured, used, and licensed by or for the Government for Governmental purposes without the payment to me of any royalties thereon.

BACKGROUND OF THE INVENTION

This invention relates to indicating apparatus; and more particularly to apparatus for indicating frost line depth.

When apparatus such as electronics gear or electrical cable, certain pipes and the like are buried in the ground it is often desirable, and in some cases necessary, that these objects be buried at a depth which is below the normal frost line of the ground in that area. In order to know to what depth such devices must be buried, one has to know the depth of the frost line for that area. For many areas the frost line depth for the coldest months has been established as generally being deeper than a given depth. Such a general depth measurement is satisfactory for many purposes and is often the depth below which local ordinances require that certain devices such as electrical cables must be buried.

While a general frost line depth is satisfactory for many purposes, there are applications that require more specific information. That is, there are instances where one needs to know to a reasonable degree of accuracy the frost line depth of the ground in a particular area during a given period of time. For example, in certain applications it may be necessary to determine the effects of freezing upon buried electronics gear. One may want to know the physical effects of freezing upon such electronics gear and/or what effects freezing has upon the performance parameters of the electronics gear. In order to obtain such test data, one needs to have accurate frost line depth measurements. There are, of course, other applications where accurate frost line depth measurements are needed.

In the past, thermocouple systems have generally been used to obtain accurate frost line depth measurements. These prior art thermocouple systems provide accurate frost line depth measurements and generally operate in a satisfactory manner. However, skilled personnel are generally needed to install and operate such thermocouple systems. Further, if a relatively large area is to be investigated by making a plurality of depth measurements, these prior art thermocouple systems become rather complex, thereby further increasing the difficulty of installation and operation and are relatively costly. Thus, a need for frost line depth measurement apparatus that is readily installed, is relatively inexpensive, and easily operated existed. This invention provides such frost line depth measurement apparatus.

The apparatus of this invention is inexpensive to manufacture, can be installed and operated by unskilled personnel and provides accurate frost line depth measurements. Further, the apparatus is reuseable and can readily be removed from one area and installed in another area.

SUMMARY OF THE INVENTION

This provides apparatus for accurately measuring the frost line depth of the ground, for example. A hollow outer tube or pipe closed on one end and open on the other end is buried in the ground with the open end slightly above the surface of the ground. The open end of the outer tube is provided with external threads. An inner tube or sleeve is filled with a white sand mixed with a temperature sensitive dye and closed on both ends. One end of a rope or like is attached to one end cap of the inner tube and the other end of the rope is attached to a threaded cap. The inner tube is lowered in to the outer tube and the threaded cap is screwed on to the threads of the outer tube.

The dye used in the sand-dye mixture is preferably flourescein which is green in color at temperatures above the freezing temperature of the ground and changes to yellow at and below the freezing temperature of the ground. When the temperature rises above the freezing temperature of the ground, the dye becomes green again.

In addition to the basic outer tube or pipe, an extension tube is provided where necessary. A coupler is provided to connect the extension tube to the outer tube and the threaded cap is secured to the top of the extension tube when the extension tube is used. The extension tube is used where the basic outer tube is not sufficiently long to be visible, for example, if the ground is covered with snow.

BRIEF DESCRIPTION OF THE DRAWING

A full and complete understanding of the exact nature and structural details of the invention can be obtained from the following detailed description when read in conjunction with the annexed drawing in which:

FIG. 4 shows an extension tube and coupler utilized with the embodiment of FIG. 1;

FIG. 5 is a pictorial view showing how frost line indicators of this invention are typically utilized; and FIG. 6 shows an inner tube removed from its outer tube to take a reading.

DETAILED DESCRIPTION OF THE INVENTION

Figure 1:
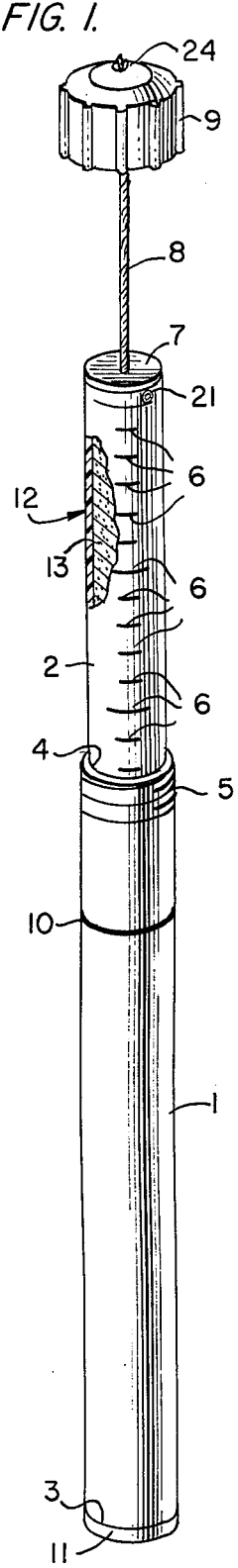
FIG. 1 shows a preferred embodiment of the frost line indicator of this invention.

Referring to FIG. 1, this figure shows a partially disassembled frost line indicator constructed in accordance with this invention. As shown in FIG. 1, the frost line indicator comprises a hollow outer tube or pipe 1 and an inner tube or sleeve 2. The end 3 of outer tube 1 is closed by the cap 11 while the end 4 is open. The external threads 5 are provided adjacent end 4. Tube 2 has a measuring scale formed along its length as indicated by the gradations 6. An end cap 7 seals the top of tube 2 and a nylon rope or like 8 has one end secured to end cap 7. The other end of rope 8 is secured to the screw cap 9. Screw cap 9 is provided with internal threads to mate with threads 5 of outer tube 1.

While not apparent from FIG. 1, inner tube 2 is shorter than outer tube 1; therefore, inner tube 2 when lowered into outer tube 1 will be completely encased by outer tube 1. In fact when completely lowered into outer tube 1, the top of inner tube 2 (the end cap 7) will be even with the band 10 provided on the outside of outer tube 1. When inner tube 2 is completely lowered into outer tube 1, screw cap 9 is threaded on threads 5 of outer tube 1. Rope 8 is provided so that inner tube 2 can be readily withdrawn from outer tube 1. Rope 8 could of course be cut to such a length that rope 8 would assure that end cap 7 is even with band 10 on outer tube 1 when cap 9 is secured to outer tube 1; however, inner tube 2 is preferably made to be exactly as long as the length of outer tube 1 between band 10 and bottom end 3 of outer tube 1. The reason for providing band 10 and the reason why inner tube 2 is made as long as the distance between band 10 and end 3 of outer tube 1 will be explained later.

A portion 12 of inner tube 2 is broken away to clearly show that inner tube 2 is filled with a mixture of sand and dye 13. The mixture 13 is preferably a 0.1% solution of fluorescein dye and medium-sized clear white sand-blasting sand. Above a certain temperature, the fluorescein dye is green and at and below this temperature the dye turns yellow. After the dye turns yellow, it will return to its green color when the temperature again rises. As will be described later, this color change provides a frost line depth measurement.

Figure 2:
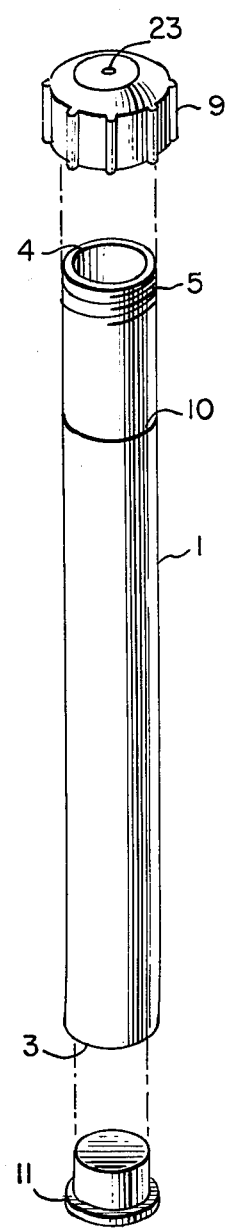
FIG. 2 shows the outer tube of FIG. 1 disassembled.

Referring to FIG. 2, this Figure shows screw cap 9 and outer tube 1 disassembled. Outer tube 1 is a hollow cylinder made of any suitable material, for example, polyvinyl chloride. Of course, any other suitable material can be utilized to fabricate tube 1.

End cap 11 is inserted into end 3 of outer tube 1. Cap 11 may be dimensioned such that it will be frictionally held in place when inserted into outer tube 1, and in addition a suitable glue may be used to secure end cap 11 to the inside of outer tube 1.

Threads 5 cut adjacent end 4 are standard pipe threads. Band 10 is applied to the outside of outer tube 1 by any suitable means such as by painting. Band 10 must be, as will be apparent, properly located on outer tube 1 and may be any color different than the color of outer tube 1, for example, band 10 can be black with outer tube 1 gray. Screw cap 9 can be made of plastic, for example, and is threaded internally with threads appropriate for mating with threads 5. Screw cap 9 is preferably brightly colored, for example, fluorescent orange. This fluorescent orange can be painted on screw cap 9 or the cap can be made of colored plastic.

Figure 3:
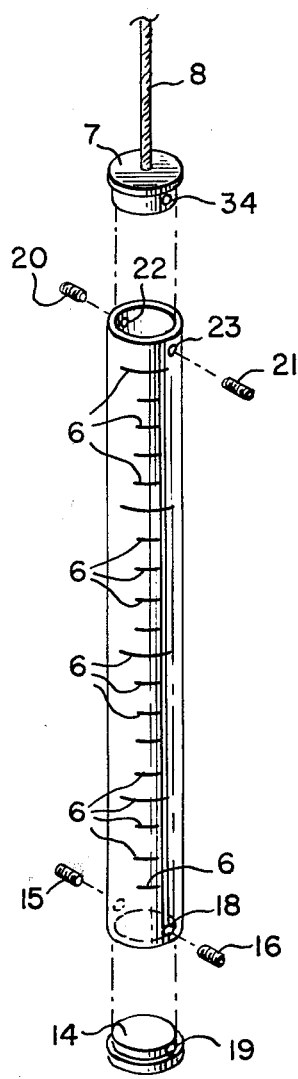
FIG. 3 shows the inner tube of FIG. 1 disassembled.

Referring now to FIG. 3, this Figure shows inner tube 2 disassembled and a portion of rope 8. As shown in FIG. 3, inner tube 2 is a hollow cylinder open at both ends. Inner tube 2 may be made of any suitable transparent material such as clear plastic. Gradations 6 form a linear measuring scale. End cap 14 is inserted into the bottom end of inner tube 2 and is secured to inner tube 2 by a suitable glue and the Allen screws 15 and 16. Holes 17 and 18 are provided adjacent the bottom end of inner tube 2 to accommodate Allen screws 15 and 16, respectively, and threaded holes are provided in end cap 14 to secure Allen screws 15 and 16 to end cap 14. Only one of these threaded holes, hole 19, is visible in FIG. 3.

After end cap 14 has been inserted into inner tube 2 and secured in place, inner tube 2 is filled with mixture 13 (FIGS. 1 and 6) which is a mixture of sand and fluorescein dye as previously mentioned. After inner tube 2 is filled with mixture 13, end cap 7 is inserted into the top of inner tube 2. End cap 2 is secured to outer tube 2 by means of glue and the Allen screws 20 and 21. The holes 22 and 23 are provided adjacent the top end of inner tube 2 to accommodate Allen screws 20 and 21 and threaded holes are provided in end cap 7 to secure Allen screws 20 and 21 to end cap 7. In FIG. 3 only the threaded hole 34 is visible.

End cap 7 has a hole through the center thereof and one end of rope 8 is threaded through the hole and is secured to end cap 7 by any suitable means such as by tying a knot in the end after threading the end of rope 8 through the hole in end cap 7. Only part of rope 8 is shown in FIG. 3. The other end of rope 8 is threaded through the hole 23 (FIG. 2) in the center of screw cap 9 and a knot 24 is tied in this end of rope 8 to secure rope 8 to screw cap 9 as is shown in FIG. 1.

In some cases it may be necessary to lengthen outer tube 1. This is accomplished by means of the extension tube 25 shown in FIG. 4. Extension tube 25 is a hollow cylinder made, preferably but not necessarily, of the same material as outer tube 1. External standard pipe threads 26 and 27 are provided adjacent each end of extension tube 25.

A coupler 28 used to connect extension 25 to outer tube 1 is threaded internally to mate with threads 26 of extension tube 25 and threads 5 of outer tube 1 to thereby connect extension tube 25 to outer tube 1. When extension tube 25 is utilized, screw cap 9 is threaded on threads 27 of extension tube 25. Of course rope 8 will have to be lengthened when extension tube 25 is used in order that inner tube 2 will be properly housed in outer tube 1. A brightly colored band 29 is provided on extension tube 25. Band 29 may be a band of fluorescent orange paint, for example.

Referring now to FIGS. 5 and 6, these Figures show how frost line indicators constructed in accordance with this invention may be utilized. In FIG. 5, the three frost line indicators 30, 31 and 32 are shown. Three holes are dug in the ground 32 by means of an auger, for example. Outer tube 1 of each of the three indicators is then inserted into a different one of these ground holes with the bottom of band 10 of each of the indicators 30, 31 and 32 even with the surface of ground 35. The inner tubes 2 of each of the indicators are then inserted in their respective outer tubes and each screw cap 9 is then threaded onto its mating threads. The three indicators are now completely installed.

In FIG. 5, indicator 31 has extension tube 25 coupled to outer tube 1 of this indicator. Normally, extension tube 25 is not utilized and in the showing of FIG. 5 would not be utilized. An extension tube 25 is used when screw cap 9 on outer tube 1 would not be visible. For example, if ground 35 were covered with snow or snow is forecast, each indicator would be provided with an extension tube 25 so that the indicators would be visible above the surface of the snow. Extension tubes would also be used if high grass or weeds are present. Thus, in FIG. 5 which shows neither snow nor high weeds, indicator 31 would not normally be provided with an extension tube 25.

In FIG. 5, only three indicators are shown. Any number of indicators can be utilized. For example, if an area of 100 yards by 100 yards is to be tested, 30 or more indicators might be used. The number of indicators utilized in a given case depends upon the area to be covered and the desired number of test points that are to be made in this area.

At any time after indicators 30, 31 and 32 have been implanted in ground 35 for a time sufficiently long to permit the indicators to attain the temperature of the surrounding ground, frost line depth measurements can be taken. A frost line depth measurement is taken by unscrewing screw cap 9 of an indicator and pulling the inner tube 2 of that indicator out of its associated outer tube. The person taking the measurements then observes inner tube 2 to see whether or not the dye of mixture 13 has changed from green to yellow and how far down the inner tube this change, if any, has taken place.

FIG. 6 shows an inner tube 2 removed from the outer tube 1 of an implanted indicator. As shown in FIG. 6, the dye of mixture 13 is yellow above the point 33 and green below this point. The distance from the top of inner tube 2 to the line 33 is read from the measuring scale formed by gradations 6. This distance gives the depth to which the ground surrounding that indicator is frozen. The fluorescein dye used in mixture 13 will change back from yellow to green when the temperature of the mixture rises above the freezing temperature of the ground. Then inner tube 2 of each indicator can be replaced in its implanted outer tube 1 if a further reading is to be taken at a later time. If the temperature increases in the area being tested, point 33 will move up inner tube 2, and if the temperature decreases the point 33 will move down inner tube 2. If no further readings are to be taken, the outer tubes are removed from the ground, and each outer tube is assembled with its associated inner tube. The indicator can then be moved to a new area that is to be tested or stored for use at some future time.

As was mentioned earlier, band 10 has to be properly located on each outer tube 1. From the foregoing discussion of FIGS. 5 and 6, the reason for this should be obvious. When an outer tube is implanted in the ground, it is implanted, as shown in FIG. 5, such that the bottom of band 10 is even with the surface of the ground. Since inner tube 2 of each indicator is dimensioned such that the top of inner tube 2 is even with the bottom of band 10 of the associated outer tube, implanting this outer tube to a depth where the bottom of band 10 is even with the surface of the ground insures that the top of inner tube 2 is even with the surface of the ground so that an accurate depth measurement is obtained from the scale provided on inner tube 2.

While band 10 serves to indicate to what depth the outer tube is to be implanted, the fluorescent orange band 29 of extension tube 25, if an extension tube is used, and the fluorescent orange screw cap 9 serve to make an indicator more visible. Instead of orange, any other bright color could be used.

While the frost line indicator of this invention is ideally suited for taking frost line depth measurements of the ground and has been specifically described herein as being so used, indicators constructed in accordance with this invention are not limited to this use alone. For example, one may want to know the certain temperature parameters of a particular bulk of material. One could implant an indicator of this invention in the material, subject the surface of the bulk of material to freezing temperatures and after a given period of time, read the indicator to determine to what depth the freezing temperature has penetrated. Further, no dimensions have been given for the various components of the indicator because the dimensions are not critical. The inner and outer tubes can be made to any practical length desired and within practical limits large or small diameter tubes can be provided. If one is conducting a test in an area that is subjected to extremely cold temperatures for prolonged periods, long tubes would have to be provided since the ground could freeze to a considerable depth. Whereas, in areas subjected to freezing temperatures for relatively short periods of time, short tubes can be used since the ground will generally not freeze to the same depth as in the colder areas.

While the invention has been described with reference to a specific embodiment, it will be obvious to those skilled in the art that various changes and modifications other than any such changes and modifications specifically mentioned can be made to the embodiment shown and described without departing from the spirit and scope of the invention as set forth in the claims.

What is claimed is:

1. A frost line depth indicator for measuring the frost line depth of a material comprising:
   a first hollow tube being closed at one end by an end cap inserted into said tube and open at its other end;
   a second hollow tube closed at one end by a first end cap having a hole through the center thereof, closed at its other end by a second end cap, and filled with a material that exhibits one color at temperatures at and below a certain temperature and a second color at temperatures above said certain temperatures, said second hollow tube being shorter than said first hollow tube and being of such size that said second hollow tube fits inside said first hollow tube;
   a rope having one of its ends threaded through said hole in said first end cap of said second hollow tube and secured to said first end cap of said second hollow tube;
   means to secure said first end cap inside said one end of said second hollow tube;
   means to secure said second end cap of said second hollow tube inside said other end of said second hollow tube;
   a cap having a hole through the center thereof and being adapted to fit over and be secured to said open end of said first hollow tube, said rope having the other of its said ends threaded through said hole in said cap and being secured to said cap; and
   a distance measuring scale formed on the surface of said second hollow tube along the length of said second hollow tube.

2. A frost line indicator as defined in claim 1 wherein said material in said second hollow tube is a mixture of white sand and fluorescein dye.

3. A frost line indicator as defined in claim 2, said first color is yellow and said second color is green.

4. A frost line indicator as defined in claim 3 wherein said means for securing said first end cap inside said one end of said second hollow tube includes first and second screws and said means for securing said second end cap inside said other end of said second hollow tube includes first and second screws.

5. A frost line indicator as defined in claim 4 wherein said cap is secured to said first hollow tube by means of threads formed internally in said cap and threads formed externally adjacent said open end of said first hollow tube.

6. A frost line indicator as defined in claim 5 wherein an extension tube having external threads adjacent both its ends is coupled to said open end of said first hollow tube by a threaded coupler, said threaded coupler having internal threads for mating with said threads adjacent said open end of said first hollow tube and for mating with said threads adjacent one end of said extension tube, said cap being secured to said threads adjacent the end of said extension tube opposite the end of said extension tube secured to said coupler when said extension tube is coupled to said open end of said first hollow tube.

7. A frost line indicator as defined in claim 6 wherein a narrow band different in color than the color of said first hollow tube is provided around the outside of said first hollow tube a predetermined distance from said open end of said first hollow tube.

8. A frost line indicator as defined in claim 7 wherein said second hollow tube is equal in length to the distance between said narrow band and said closed end of said first hollow tube.

9. A frost line depth indicator as defined in claim 8 wherein said cap is fluorescent orange in color.

10. A frost line depth indicator as defined in claim 9 wherein said fluorescein dye is a 0.1% solution and said sand is a medium size clean white sand-blasting sand.

11. A frost line indicator as defined in claim 10 wherein the frost line depth to be measured is the frost line depth of the ground and said first hollow tube is implanted in said ground with the bottom edge of said narrow band even with the surface of said ground and said second hollow tube is inserted into said first hollow tube with said cap secured to said open end of first hollow tube.

12. A frost line depth indicator for measuring the frost line depth of the ground comprising:
 a first hollow tube being closed at one end, open at its other end, having external threads formed adjacent its open end and having a narrow band formed around its outer surface a predetermined distance from said open end, said narrow band being different in color than the outside surface of said first hollow tube;
 a second hollow tube being closed at both ends and being filled with a mixture of white sand and fluorescein dye, said second hollow tube being equal in length to the distance between said closed end of said first hollow tube and the bottom edge of said narrow band and being of such a diameter that said second hollow tube fits inside said first hollow tube;
 a brightly colored screw cap adapted to mate with said threads adjacent said open end of said first hollow tube to thereby secure said screw cap to said open end of said first hollow tube to cover said open end of said first hollow tube;
 a rope having one end secured to one end of said second hollow tube and having its other end secured to said screw cap such that said rope provides a means of withdrawing said second hollow tube from inside said first hollow tube; and
 a distance measuring scale formed on the surface of said second hollow tube along the length of said second hollow tube, whereby a frost line depth measurement of said ground is taken by implanting said first hollow tube in said ground such that the bottom edge of said narrow band is even with the surface of said ground, inserting said second hollow tube in said first hollow tube, securing said screw cap to said open end of said first hollow tube, and at the time said frost line depth measurement is to be taken by withdrawing said second hollow tube from said first hollow tube by unscrewing said screw cap from said open end of said first hollow tube and pulling said second hollow tube out of said first hollow tube by means of said rope and observing the color of said mixture of sand and fluorescein dye, said mixture being yellow to the depth which said ground is frozen and green in color below this depth, said scale formed on said second hollow cylinder providing a direct reading of the frost line depth.

13. A frost line depth indicator as defined in claim 12 wherein an extension tube is coupled to said first hollow tube by means of a threaded coupler.

14. A frost line depth indicator as defined in claim 13 wherein said mixture that is yellow in color turns green in color when the temperature of said mixture rises above the freezing temperature of said ground.

* * * * *